United States Patent
Hiraoka

(10) Patent No.: US 6,875,457 B1
(45) Date of Patent: Apr. 5, 2005

(54) METHOD OF PREVENTING BROWNING OR DARKENING OF FISH AND METHOD OF TREATING BROWNED OR DARKENED FISH

(76) Inventor: Kenichi Hiraoka, No. 3970-15, Mukai-Higashi-cho, Onomichi-shi, Hiroshima-ken (JP)

( * ) Notice: Subject to any disclaimer, the term of this patent is extended or adjusted under 35 U.S.C. 154(b) by 0 days.

(21) Appl. No.: 09/547,223

(22) Filed: Apr. 11, 2000

(30) Foreign Application Priority Data

| Apr. 30, 1999 | (JP) | 11-124322 |
| May 11, 1999 | (JP) | 11-129789 |
| May 17, 1999 | (JP) | 11-136192 |

(51) Int. Cl.[7] .............................................. A23L 1/325
(52) U.S. Cl. ..................... 426/253; 426/262; 426/332; 426/335; 426/643
(58) Field of Search ................... 426/253, 262, 426/332, 335, 643

(56) References Cited

U.S. PATENT DOCUMENTS

| 3,962,448 A | 6/1976 | Baile et al. |
| 4,060,644 A | 11/1977 | Braid ........................... 426/261 |
| 4,963,387 A | 10/1990 | Nakagawa et al. |
| 5,019,403 A | 5/1991 | Krochta |
| 5,069,922 A | 12/1991 | Brotsky et al. |
| 5,108,649 A | 4/1992 | Matsumoto et al. |
| 5,126,153 A | 6/1992 | Beck |
| 5,143,739 A | 9/1992 | Bender et al. |
| 5,192,570 A | 3/1993 | Bender et al. |
| 5,262,186 A | * 11/1993 | Bender et al. .............. 426/332 |
| 5,268,185 A | 12/1993 | Bender et al. |
| 5,283,073 A | 2/1994 | Bender et al. |
| 5,354,568 A | 10/1994 | Bender et al. |
| 5,389,389 A | 2/1995 | Beck |
| 5,512,309 A | 4/1996 | Bender et al. |
| 5,556,454 A | 9/1996 | Bender |
| 5,635,231 A | 6/1997 | Bender et al. |
| 5,700,507 A | 12/1997 | Bender et al. |
| 5,989,611 A | 11/1999 | Stemmler et al. |
| 6,123,981 A | 9/2000 | Bender et al. |
| 6,284,297 B1 * | 9/2001 | Sogabe ........................ 426/262 |
| 6,287,617 B1 | 9/2001 | Bender et al. |

FOREIGN PATENT DOCUMENTS

| CN | 1066681 | 12/1992 |
| EP | 0260623 | 9/1987 |
| ES | 8500552 | 7/1983 |
| GB | 404539 | 6/1933 |
| GB | 790812 | 3/1956 |
| GB | 2009585 | 6/1979 |
| JP | 4-304839 | 10/1992 |
| JP | 6-7075 | 1/1994 |
| JP | 10-53 | 1/1998 |
| JP | 11-89543 | 4/1999 |
| KR | 8301808 | 9/1983 |
| KR | KB8600480 | 4/1986 |
| RU | 772518 | 10/1980 |
| SU | 1336291 | 9/1998 |
| TW | 035672 | 3/1981 |

OTHER PUBLICATIONS

L.I. Borixockina et al., Rational utilization of waste from fish and invertebrate processing, 1988, pp. 112–113, 117 and 119.

Vietnamese Office Action, May 17, 2004, "Notice of Result of Examination as to Substance", with attached unofficial English translation.

* cited by examiner

Primary Examiner—Arthur L. Corbin
(74) Attorney, Agent, or Firm—Oblon, Spivak, McClelland, Maier & Neustadt, P.C.

(57) ABSTRACT

The present invention relates a method of preventing the browning or darkening in fish so as to provide fish having color which is the same as that of the freshly caught fish. The present invention also relates to a method of preparing food from such fish.

28 Claims, No Drawings

METHOD OF PREVENTING BROWNING OR DARKENING OF FISH AND METHOD OF TREATING BROWNED OR DARKENED FISH

BACKGROUND OF THE INVENTION

The present invention relates to a method of preventing the browning or darkening of fish such as small fish or fry, for example, young sardines, eels, and sand lances, and also a method of obtaining fish free of the browning or darkening from the browned or darkened fish. The present invention also relates to foods seasoned with various seasonings such as specially seasoned sea-urchin eggs, which keep the commercial value thereof and free from dripping of fish meat or body for a long period of time, from raw small fish such as the youngs of fish and fry, e.g., young sardines, eels, and sand lances, and a method of producing them. In addition, the present invention relates to fish prevented from the browning or darkening, or those recovered from the browning or darkening.

Fish such as young sardines (the young of fish, e.g., anchovies, pilchards, Japanese icefish and eels) and sand lances were hitherto caught on a fishing boat in a fishery, then usually put on the market, and treated by removing stains and foreign matters from them, washing them with tap water, sea-water or the like, draining and packing them and freezing and storing them in a factory, or they were shipped while they were kept cold. In some cases, the drained fish were treated with hydrogen peroxide, chlorine or the like, boiled, drained again, packed and shipped.

On the other hand, in the production of dried young sardines, the young sardines are packed in ice on the ship, and then washed with water if necessary, boiled with hydrogen peroxide (in 1 to 8% salt water), drained and dried in a factory or the like.

It is known, however, that when small fish such as young sardines are caught and dead, their body surfaces become brown or darkened, and the original color such as whitish tone of the fish rapidly disappears. Supposedly, this phenomenon occurs because bacteria in sea water are attached to the surface of the dead fish body to start the decomposition of the protein of the body surface. It is generally considered that because the cells per se of the youngs of fish and fry which are rapidly growing are soft, they are easily decomposed or deteriorated by bacteria. Although it is eagerly demanded to eat as fresh as possible fish free from browning or darkening, it has been impossible until now to provide fish kept fresh and also kept from the browning or darkening.

The methods employed in the prior art include a method wherein fish caught in a fishery are transported to a factory as soon as possible and boiled there as soon as possible to prevent them from the browning or darkening; a method wherein the fish are treated with hydrogen peroxide or chlorine; and a method wherein the fish are colored with a colorant so that they look fresh even after they were browned or darkened. However, in fact, these methods are yet unsatisfactory for the following reasons: they cost much labor; they cause problems of the environmental pollution; and when the colorant is used, the colored fish are yellowed during the storage for a long period of time.

It is known, however, that when dead, small fish such as young sardines are left for even a short time, the deterioration starts on the surface of the fish body to gradually cause the body dripping and to lose its original shape. As a result, the fish bodies become thin or they are broken to seriously lower the commercial value thereof. Supposedly, this phenomenon occurs because bacteria in sea water are attached to the surface of the fish bodies to start the decomposition of the protein on the body surface. It is generally considered that because the cells per se are soft particularly in the young of fish and fry which are rapidly growing, they are easily decomposed or deteriorated by bacteria.

For the reasons described above, the small fish are treated with hydrogen peroxide or chlorine, washed with water, packed, frozen and put on the market as rapidly as possible after they are caught. However, as the time passes after the thawing, the body dripping and the losing of the shapes of them are accelerated, and also the body surface is browned or darkened. In fact, the commercial value of them is seriously lowered in a short time of about 4 to 5 hours. These problems were not yet been solved. Although it was tried to distribute a food, prepared by mixing raw, small fish such as young sardines with a paste of seasoned sea-urchin eggs, by transporting the food in frozen state and selling it while it is thawed in a shop according to the frozen chilled system, such a system was impossible on the market because the body dripping of the fish is caused and the shape of the bodies thereof is changed to such an extent that the original shape could not be recognized while they are sold in the chilled state for 3 to 4 days after the thawing.

Many of small fish such as young sardines were imported until now. The small fish to be imported to Japan are usually obtained by transporting these fish caught on a fishing boat in a fishery of a foreign country through, for example, a market, then treating them by removing stains and foreign matters from them, washing them with sea water or the like, and draining, packing and freezing them in a factory. The small fish are also imported in the form of dried fish.

It is known, however, that when the captured small fish such as young sardines are dead, the body surfaces of them are discolored and become brown or dark as described above, and the original color such as whity tone of the fish rapidly disappears. It is also known that when a fresh small fish is left for even a short time, the deterioration starts on the surface of the fish body to gradually cause body dripping and to lose its original shape. As a result, the fish body becomes thin or it is broken to seriously lower the commercial value thereof. Thus, imported small fish have usually been browned or darkened in the course of the treatment in foreign countries, and they are imported in the browned or darkened state.

In addition, the discoloration of the small fish is caused or further accelerated by drying. As a result, the imported small fish generally have lost their fresh color and they have been discolored and browned and, in an extreme case, they have been darkened. In the course of an additional treatment or further transportation or storage of the imported small fish in Japan, the discoloration further proceeds in general to make the commercial value of them lower.

In the prior art, such browned or darkened, imported small fish were treated by a method wherein they are bleached with a bleaching agent such as chlorine or hydrogen peroxide. When the degree of the browning or darkening is low, such a color is masked by the treatment with a colorant to fade the brown or dark color. However, as the period of the storage or transportation after the treatment becomes longer, the browning or darkening is inclined to further proceed and the commercial value of the fish is lowered before the consumers get them. When the degree of the browning or darkening is high, the fish could be no more treated at all in the prior art.

SUMMARY OF THE INVENTION

The object of the present invention is to provide fish having a color, which is the same as that of the freshly caught fish, by effectively preventing them from the browning or darkening.

Another object of the present invention is to provide a food, prepared by mixing raw, small fish such as young sardines with a seasoning such as a paste of seasoned sea-urchin eggs, which is free of the body dripping and which keeps its commercial value for a long period of time.

Still another object of the present invention is to provide a method of producing small fish having a reduced degree of browning or darkening or free from the browning or darkening by treating browned or darkened fish, and a method for the treatment.

After intensive investigations made for the purpose of solving the above-described problems, the inventors have found that fish having a color, which is the same as that of the freshly caught fish, can be provided by effectively preventing the browning or darkening of not only the youngs of fish such as young sardines (the youngs of fish, e.g. anchovies, pilchards, Japanese icefish and eels) and sand lances (or Kibinago, a member of the round herring family) but also large fish by treating them with an aqueous alkali solution and then washing off or neutralizing the aqueous alkali solution.

The inventors have also found that by the above-described treatment, a food keeping its commercial value and free of the body dripping for a long period of time can be prepared by mixing raw, small fish such as fries and the youngs of fish, e.g. young sardines and sand lances, with a seasoning such as a paste of seasoned sea-urchin eggs.

The inventors have further found that small fish free from the browning or darkening can be obtained by treating the browned or darkened, small fish with an aqueous alkali solution and then washing off or neutralizing the aqueous alkali solution attached to the treated fish.

The present invention has been completed on the basis of these findings.

DESCRIPTION OF THE PREFERRED EMBODIMENTS

The detailed description will be made on the present invention.

The fish which can be treated according to the present invention may be both fully-grown fish and the youngs of fish. However, the present invention can be particularly suitably applied to fries and the youngs of the fish such as young sardines (fries or the youngs of fish, e.g. anchovies, pilchards, Japanese icefish and eels) and sand lances (or Kibinago, a member of the round herring family). The effect of preventing the browning or darkening of fish is particularly remarkable on small fish originally having the white skin. Particularly, the present invention is effective on freshly caught fish having the white skin. However, the present invention can be applied also to fully-grown fish.

These materials to be treated may be any of raw fish, raw fish once stored in frozen state and then thawed or chilled fish. It is the best that fish caught in the fishery are immediately treated on board the ship.

In the treatment of the browned or darkened small fish, the fish may be those frozen after the catching or dried fish. These small fish have usually been browned or darkened.

In case the small fish are dried ones, they are preferably immersed in a salt water of a low concentration before the treatment with the aqueous alkali solution of the present invention. By the immersion, the dry small fish are moistened with water.

The immersion treatment can be conducted by, for example, keeping the fish in the salt water in a predetermined place such as a refrigerator for a predetermined period of time. The concentration of the salt water to be used is, for example, 0.1 to 6.0%, particularly preferably 0.5 to 4.0%. The immersion temperature is, for example, not higher than 10° C., preferably 3 to 8° C., and the immersion time is, for example, 30 minutes to 24 hours, preferably 1 to 16 hours.

In the present invention. the fish are first treated in an aqueous alkali solution. This treatment can be conducted, for example, by immersing the fish in the aqueous alkali solution or by spraying the solution on the fish.

The aqueous alkali solution to be used herein is, for example, a solution prepared by dissolving an alkali in water. The alkali can be selected from various alkalis capable of forming alkaline aqueous solutions thereof. Examples of the alkalis are sodium hydroxide, potassium hydroxide, calcium hydroxide, disodium hydrogenphosphate, trisodium phosphate, dipotassium hydrogenphosphate, tripotassium phosphate, diammonium hydrogenphosphate, sodium polyphosphates, potassium polyphosphates, calcium oxide, calcium phosphate, magnesium carbonate, ammonium carbonate, sodium carbonate, potassium carbonate, calcium carbonate, sodium hydrogencarbonate and potassium hydrogencarbonate. These alkalis may be used either alone or in the form of a mixture of them. The alkalis include those easily available on the market, such as calcium carbonate and sodium carbonate.

The aqueous alkaline solution has a pH of higher than 7.0. For example, for the treatment of browned or darkened small fish, pH of the solution must be higher than 8.0. For the rapid treatment, a high pH is preferred. The pH is usually 7.5 to 13.0, preferably 8.5 to 13.0, and particularly preferably 9.5 to 12.0.

The time needed for the treatment with the aqueous alkali solution usually varies depending on the treatment temperature. The treatment time is usually 1 minute to 24 hours, preferably 15 minutes to 1 hour.

The treatment temperature is usually 0 to 10° C., preferably 0 to 5° C. When the treatment temperature is lower than 0° C., a long time is necessitated for the treatment, while the food material is difficult to be contaminated with miscellaneous bacteria. On the contrary, when the treatment temperature is higher than 10° C., the denaturation or deterioration of protein is accelerated to cause the problem of losing the shape of the fish.

If necessary, additives such as saccharides and salts (for example, sodium chloride) may be added to the aqueous alkali solution for the purpose of improving the penetration of the solution into the material to be treated. The saccharides usable herein are various, and they include reducing malt sugar, sorbitol and cane sugar.

The fish thus treated with the alkali are washed with water to remove the aqueous alkali solution from the surfaces of the fish bodies or the fish are neutralized immediately after the alkali treatment or after some optional treatments.

The washing time which varies depending on the alkali treatment time is usually 1 minute to 24 hours, preferably 30 minutes to 3 hours.

The neutralization treatment can be conducted by, for example, spraying an acidic solution to the alkali-treated fish or by immersing the fish in the acidic solution.

The acidic solutions usable herein are aqueous solutions of inorganic acids such as hydrochloric acid, sulfuric acid and nitric acid, and organic acids such as acetic acid, sulfonic acid and citric acid. Preferred acids are acetic acid, citric acid, etc.

When the acidic solution is sprayed, pH of the solution is usually 4.0 to 6.6, preferably 5.0 to 6.5.

The pH of the acidic solution for the immersion is for example, 4.0 to 6.8, preferably 5.5 to 6.5.

The neutralization can be conducted in the course of the boiling except the case of treating raw fish. By the boiling, the meat of the fish becomes firm advantageously. The neutralization is preferably conducted by acidifying the fish in the salt water. The concentration of the salt water is, for example, 1 to 10% by mass, preferably 3 to 8% by mass.

The neutralization temperature is the boiling point of the salt water, which is usually about 90 to 105° C.

The neutralization time, which varies depending on the alkali treatment time, is usually 1 second to 2 hours, for example, 10 minutes to 2 hours and preferably 30 minutes to 1 hour. In the neutralization, pH of water on the surface of the fish is determined, and a weakly acidic pH is also acceptable.

In the present invention, the fish thus washed with water or neutralized is then packed, and the packed fish can be stored in frozen or chilled state. In the preparation of sheets of dried sardines, the sardines thus treated with the aqueous alkali solution and then washed with water or neutralized are dried in the sheet form in the sun or forcedly dried by heating.

In the preparation of a food containing such raw, small fish in the present invention, the fish thus washed with water or neutralized are then treated with a seasoning drained and further treated, if necessary, and packed. The packed fish can be stored in frozen or chilled state and put on the market.

The seasoning can be selected from various ones. Preferred seasonings are, for example, a paste of seasoned sea-urchin eggs, salted walleye pollack eggs and a seasoning mix for Korean pickles.

The fish can be washed with tap water or a salt water having a concentration of, for example, 1 to 6%, preferably 1 to 4%. In the latter case. the meat of the fish thus treated becomes firm advantageously.

After the treatment with the aqueous alkali solution, the fish immersed in the solution may be frozen as they are. In such a case, the fish can be washed with water when they are thawed by immersing in water after the transportation in the frozen state.

According to the present invention wherein raw fish are treated with the alkali and then washed with water or neutralized, the fish can be effectively prevented from the browning or darkening even when they are stored in the frozen state, chilled state or packed state for a long period of time, and the fish or fish products keeping their fresh color can be obtained.

By the treatment with the aqueous alkali solution, bacteria attached to the fish can be substantially killed. Therefore, the fish treated according to the present invention do not substantially lose their shape during storage, and the period of time until they lose their shape can be remarkably prolonged. As a result, for example, the treated fish can be transported to a distant place or they can be stored for a longer period of time than that in the prior art. Thus, the yield can be remarkably improved and the fish such as young sardines in the fresh form can be served for the consumers.

According to the present invention wherein raw, small fish are treated with the alkali and then washed with water or neutralized, the fish can be effectively prevented from the browning or darkening even when they are stored in the frozen, chilled or packed state for a long period of time, and the foods containing raw, small fish still keeping their fresh color can be obtained.

By the treatment with the aqueous alkali solution, bacteria attached to the raw, small fish can be substantially killed. Therefore, the fish treated according to the present invention are substantially kept from losing their shape or from body dripping during the storage even in the form of a mixture with another food.

In addition, when browned or darkened small fish are treated with the alkali and then washed with water or neutralized, the browned or darkened part substantially disappears in each fish. Even after the storage in frozen, chilled or packed state for a long period of time, the small fish still keeping the fresh color thereof and kept from being browned or darkened can be provided.

If necessary, in addition to the raw, small fish, dried products can be prepared by treating the small fish, which have been treated with the alkali and then washed with water or neutralized and which are free from the browning or darkening, with salt water, washing them with water, draining them, and drying them. In addition, the fish thus treated with the salt water can be boiled, drained, cooled and directly packed in bags to prepare boiled products.

The treatment with the salt water is conducted for controlling the salt content of the product. The concentration of the salt water is, for example, 1 to 5%, particularly preferably 2 to 4%. The immersion temperature is, for example, not higher than 10° C., preferably 3 to 8° C. The immersion time is, for example, 10 minutes to 5 hours, preferably 30 minutes to 3 hours.

The fish are boiled at a temperature of usually 90 to 100° C., preferably 92 to 97° C. The boiling is effective for the storage of the product and also for the prevention of them from discoloration because they are sterilized by this treatment. The boiling is conducted for usually 1 to 10 minutes, preferably 2 to 8 minutes.

Dried fish products were prepared by treating imported, dried fish products with salt water, washing them with water, draining them and drying them in the sun in the prior art. When the fish products were boiled for the purpose of improving the storability after the draining, the browning or darkening was accelerated in the prior art. Therefore, such a technique was not employed hitherto.

The fish products can be cooled by, for example, storing them in a refrigerator. The suitable cooling temperature is, for example, 1 to 10° C. The cooling time is, for example, about 0.5 to 2 hours.

The drying can be conducted in the sun or by a mechanical drying method with hot air or the like as in the prior art.

The following Examples will further illustrate the present invention.

EXAMPLE 1

(Prevention of Young Sardines from the Browning or Darkening)

An alkaline treating solution having the following composition was prepared:

| | |
|---|---|
| Sodium acetate (buffer) | 38% |
| Calcium oxide (alkali) | 30% |
| D-glucose (penetrant) | 32% |

10 g of the alkaline treating solution prepared as described above was dissolved in water to obtain 1,000 ml of an aqueous alkali solution having a calcium oxide content of 0.3% and pH of 11.

Young sardines caught in a fishery were immediately immersed in this aqueous alkali solution under suitable stirring at about 5° C. for 40 minutes on board the ship. Then the young sardines thus immersed were taken out, once washed with running water and then washed with 2000 ml of water at about 5° C. for 40 minutes. The young sardines thus washed with water were drained and stored in frozen state.

For comparison, the same treatment as that of Example 1 was repeated except that the alkali treatment and the washing with water were omitted to obtain comparative young sardines.

The change in the skin color (white) of the young sardines thus treated or untreated was observed to obtain the following results: The young sardines treated according to the present invention kept the original white skin of the fresh fish, while the untreated young sardines were gradually colored brown during the storage, and 30 minutes after, they were seriously colored dark brown.

EXAMPLE 2
(Prevention of Sheets of Dried Pilchards from the Browning or Darkening)

Pilchards obtained on the market were immersed in the aqueous alkali solution under suitable stirring at about 5° C. for 40 minutes in the same manner as that of Example 1. Then the pilchards were taken out, once washed with running water, and then washed with 2,000 ml of water at about 5° C. for 40 minutes. They were drained, dried in the sheet form in the sun for 2 days to obtain the sheets of dried sardines.

For comparison, the pilchards were directly dried in the sun without the above-described treatment to obtain comparative sheets of dried sardines.

The sheets of dried pilchards prepared by the method of the present invention were substantially free from the browning or darkening even after the storage for 14 days. On the contrary, the comparative sheets of dry pilchards were colored brown in the course of the drying, and the color was gradually darkened during the storage to make the keeping of the white color impossible.

EXAMPLE 3
(Prevention of Boiled, Young Sardines from the Browning or Darkening)

Young sardines caught in a fishery were immediately immersed in the aqueous alkali solution, prepared as described above, under suitable stirring at about 5° C. for 40 minutes on board the ship. Then the young sardines thus immersed were taken out, once washed with running water and then washed with 2000 ml of water at about 5° C. for 40 minutes. The young sardines thus washed with water were drained and boiled at 95° C. for 3 minutes.

For comparison, the same treatment as that of Example 3 was repeated except that the alkali treatment and the washing with water were omitted, and then the fish were boiled (salt water concentration: 7 mass %; adjusted at about pH 6.5 with hydrogen peroxide) to obtain comparative young sardines.

The young sardines treated according to the present invention and then boiled were substantially free from the browning or darkening even after the storage for 20 days or more. On the contrary, the comparative, boiled young sardines were already colored brown immediately after the boiling, and the color was gradually darkened during the storage.

EXAMPLE 4
(Prevention of Young Sardines from the Browning or Darkening)

An alkaline treating solution having the following composition was prepared:

| | |
|---|---|
| Sodium acetate (buffer) | 38% |
| Calcium oxide (alkali) | 30% |
| D-glucose (penetrant) | 32% |

10 g of the alkaline treating solution prepared as described above was dissolved in water to obtain 1,000 ml of an aqueous alkali solution having a calcium oxide content of 0.3% and pH of 11.

Raw, young sardines caught in a fishery were immediately immersed in this aqueous alkali solution under suitable stirring at about 5° C. for 40 minutes on board the ship. Then they were neutralized at pH 6.5 (controlled with acetic acid) at a temperature of 92 to 100° C. (inlet temperature: 96 to 100° C., outlet temperature: 92° C.) for 2 to 3 minutes, drained and stored in frozen state.

For comparison, the same treatment as that of Example 4 was repeated except that the alkali treatment and the washing with water were omitted and then the young sardines were boiled (salt water concentration: 7 mass %; adjusted at about 6.5 with hydrogen peroxide) to obtain comparative young sardines.

The change in the skin color (white) of the young sardines, thus treated or untreated during the storage in the frozen state, was observed to obtain the following results: The young sardines treated according to the present invention kept the original white skin of the fresh fish, while the untreated young sardines were gradually colored brown during the storage, and 30 minutes after, they were seriously colored dark brown. The meat of the boiled and neutralized young sardines was firm.

EXAMPLE 5
(Food Containing Fresh Young Sardines)

Step 1

An alkaline treating solution having the following composition was prepared:

| | |
|---|---|
| Sodium acetate (buffer) | 38% |
| Calcium oxide (alkali) | 30% |
| D-glucose (penetrant) | 32% |

10 g of the alkaline treating solution prepared as described above was dissolved in water to obtain 1,000 ml of an aqueous alkali solution having a calcium oxide content of 0.3% and pH of 12.6.

Raw, young sardines caught in a fishery were immediately immersed in this aqueous alkali solution under suitable stirring at about 5° C. for 40 minutes on board the ship. Then the young sardines thus immersed were taken out, once washed with running water and then washed with 2000 ml of water at about 5° C. for 40 minutes. The young sardines thus washed with water were immersed in 4% salt water for 30 minutes to firm the meat thereof, drained and stored in frozen state.

Step 2

A seasoning material having the following composition was prepared:

TABLE 1

| Ingredient | Amount (g) |
| --- | --- |
| Salt | 0.4 |
| Sugar | 6.7 |
| Sorbitol | 13.6 |
| Sodium glutamate | 0.4 |
| Mirin (sweet sake for seasoning) | 6.7 |
| Powdered cayenne | 0.1 |
| Seasoned vinegar | 1.1 |
| Water | 67.4 |
| Total: | 100.0 |

100 g of the thawed, raw, young sardines obtained in step 1 were mixed with 100 g of the seasoning material obtained in step 2 at 13° C. for 3 minutes. The obtained mixture was left to stand for 30 minutes to penetrate the seasoning material into the sardines, and then packed as they were to obtain a young sardine-containing food.

The meat of the young sardines contained in the food was kept firm, and even after leaving the food at room temperature for 5 days, any body dripping was not recognized and the fish retained their shape.

For comparison, the same treatment as that of Example 5 was repeated except that the alkali treatment and the washing with water were omitted to obtain a comparative food.

In the comparative food, the fish began to lose their shape immediately after the mixing with the seasoning material, and the food had no commercial value.

EXAMPLE 6
(Food Containing Young Sardines)

100 g of the thawed, young sardines obtained in step 1 were mixed with 100 g of the seasoning material obtained in step 2 in the same manner as that of Example 5. Then the young sardines were separated from the seasoning material and mixed with 100 g of thawed, peeled walleye pollack eggs which had been seasoned with salt and mustard. The obtained mixture was packed as it was to obtain a food comprising the young sardines and the seasoned walleye pollack eggs.

The taste of the food obtained as described above was actually unchanged and any body dripping of the fish was not recognized and the fish retained their shape even after leaving the food under cooling (10° C. or below) for 5 days.

For comparison, the same treatment as that of Example 6 was repeated except that the alkali treatment and the washing with water were omitted to obtain a comparative food.

In the comparative food, the fish began to lose their shape immediately after the mixing with the thawed, seasoned walleye pollack eggs, and the food became like a paste of dumpling and had no commercial value.

EXAMPLE 7
(Food Containing Young Sardines)

Young sardines seasoned with a seasoning for Korean pickles were prepared in the same manner as that of Example 6 except that 100 g of a commercially available seasoning for Korean pickles (liquid; a product of Momoya) was used in place of the seasoned walleye pollack eggs.

The taste of the food obtained as described above was actually unchanged and any body dripping of the fish was not recognized and the fish retained their shape even after leaving the food at room temperature (18 to 25° C.) for 7 days.

For comparison, the same treatment as that of Example 7 was repeated except that the alkali treatment and the washing with water were omitted to obtain a comparative food.

In the comparative food, the fish began to lose their shape and the fermentation began immediately after the mixing with the seasoning for Korean pickles.

Also, when the paste of seasoned sea-urchin eggs was used, the raw fish-containing food which had previously been considered impossible to prepare could be achieved and could maintain its commercial value for a long period of time.

EXAMPLE 8

Dried young sardines (salt content: 5.0%) imported from Korea were used as the dry starting material.

50 kg of the dry young sardines were immersed in 150 kg of salt water (common salt concentration: 1%) in a refrigerator at 5° C. for one hour.

After draining, the young sardines were immersed in an alkaline treating solution having the following composition in a refrigerator at 5° C. for 16 hours.

| Alkaline treating solution | |
| --- | --- |
| Sodium acetate (buffer) | 40% |
| Calcium oxide (alkali) | 30% |
| D-glucose (penetrant) | 30% |

Then the young sardines treated with the alkali were immersed in water at 6° C. for one hour and then washed with water.

They were then immersed in 3.5% aqueous common salt solution at 6° C. for one hour to control the salt concentration, drained and dried in the sun.

The dry product thus obtained was substantially free from the browning or darkening, and they were not browned or darkened thereafter.

EXAMPLE 9

The young sardines treated with 3.5% aqueous common salt solution in Example 8 were then boiled at 95° C. for 3 minutes and then cooled by storing them in a refrigerator. They were directly packed in a plastic bag to obtain the boiled product.

The boiled product thus obtained was not browned during the storage at 6° C. for 20 days.

The method of the present invention can be employed not only for the dried products used in the above-described Example but also for thawed, browned or darkened small fish. Further, as described above, the present invention is also applicable to various kinds of small fish other than the young sardines treated in this Example.

EXAMPLE 10

The same procedure as that of Example 8 was repeated except that the young sardines treated with the alkaline treating solution were neutralized at a temperature of 92 to 100° C. (inlet temperature: 96 to 100° C., outlet temperature: 92° C.) at pH 5.5 (adjusted with acetic acid) for 2 or 3 minutes.

The dry product thus obtained was substantially free from browning or darkening, and they were not browned or darkened thereafter.

According to the method of the present invention wherein a fish material, such as young sardines, is treated with the aqueous alkali solution and then the aqueous alkali solution is washed out of the material, or neutralized, the fish can be effectively prevented from the browning or darkening. Thus, the storage of fish for a long period of time while keeping their fresh color has been made possible, though the storage thereof in such a good state was considered to be impossible in the prior field.

Foods capable of keeping their commercial value for a long period of time without causing any body dripping of raw, small fish such as young sardines can be obtained according to the method of the present invention wherein such raw, small fish are treated with the aqueous alkali solution, and then the aqueous alkali solution is washed out of the treated fish or neutralized and then they are treated with a seasoning material such as a seasoning for Korean pickles, walleye pollack eggs seasoned with salt and mustard or paste of seasoned sea-urchin eggs.

In addition, when browned or darkened small fish are treated with the aqueous alkali solution and then this solution is washed off or neutralized, the browned or darkened part substantially disappears in each fish. This treat is also effective in keeping the small fish from the browning or darkening.

What is claimed is:

1. A method of preventing whole fish from browning or darkening, which comprises treating the whole fish with an aqueous alkali solution of a compound selected from the group consisting of sodium hydroxide, potassium hydroxide, calcium hydroxide, calcium oxide, magnesium carbonate, ammonium carbonate, sodium carbonate, sodium hydrogen carbonate, potassium hydrogen carbonate, and combinations thereof and then washing off or neutralizing the aqueous alkali solution attached to the treated whole fish, wherein the treating is performed at a temperature of from 0 to 10° C. in the absence of peroxide or chlorine.

2. A method of treating a whole fish, wherein the whole fish is immersed in a solution of from 0.1 to 6.0% salt water at a temperature no greater than 10° C. for a time of from 30 minutes to 24 hours before treating the whole fish according to the method of claim 1.

3. The method according to claim 1, wherein the aqueous alkaline solution has a pH of higher than 7.0.

4. The method according to claim 1, wherein the whole fish are treated with the aqueous alkali solution from 1 minute to 24 hours at a temperature of from 0 to 10° C.

5. The method according to claim 1, wherein the aqueous alkaline solution further comprises any one additive selected from the group consisting of saccharides, salts, and combinations thereof.

6. The method according to claim 1, wherein the time for the washing off of the aqueous alkali solution attached to the treated whole fish is from 1 minute to 24 hours.

7. The method according to claim 1, wherein the neutralizing of the aqueous alkali solution attached to the treated whole fish comprises spraying the alkali-treated whole fish with an acidic solution at a pH of from 4.0 to 6.6.

8. The method according to claim 1, wherein the acidic solution comprises any one selected from the group consisting of inorganic acid, organic acid, and combinations thereof.

9. The method according to claim 1, wherein the neutralizing of the aqueous alkali solution attached to the treated whole fish comprises immersing the alkali-treated whole fish in an acidic solution at a pH of from 4.0 to 6.8.

10. The method according to claim 9, wherein the acidic solution comprises any one selected from the group consisting of inorganic acid, organic acid, and combinations thereof.

11. The method according to claim 1, wherein the neutralizing of the aqueous alkali solution attached to the treated whole fish is performed during the course of boiling the whole fish in a solution of from 1 to 10% salt water by mass.

12. The method according to claim 1, further comprising any one of the steps selected from the group consisting of treating the whole fish with salt water, boiling the whole fish, draining the whole fish, cooling the whole fish, directly packing the whole fish in bags, and combinations thereof after the aqueous alkali solution attached to the treated whole fish is washed or neutralized.

13. The method according to claim 1, further comprising
treating the whole fish with a solution comprising from 1 to 5% salt water for a time from 10 minutes to 5 hours at a temperature not greater than 10° C.;
washing the whole fish with water;
draining the whole fish; and
drying the whole fish
wherein the treating, washing, draining and drying is performed after the aqueous alkali solution attached to the treated whole fish is washed or neutralized.

14. The method according to claim 1, wherein the whole fish is boiled at a temperature from 90 to 100° C. for a time of from 1 to 10 minutes.

15. The method according to claim 1, wherein the aqueous alkali solution does not contain hydrogen peroxide.

16. A method of preparing whole fish protected from browning or darkening, which comprises treating the whole fish having browned or darkened skin with an aqueous alkali solution of a compound selected from the group consisting of sodium hydroxide. potassium hydroxide, calcium hydroxide, calcium oxide, magnesium carbonate, ammonium carbonate, sodium carbonate, sodium hydrogen carbonate, potassium hydrogen carbonate, and combinations thereof and then washing off or neutralizing the aqueous alkali solution attached to the treated whole fish, wherein the treating is performed at a temperature of from 0 to 10° C. in the absence of peroxide or chlorine.

17. The method according to claim 16, wherein the aqueous alkali solution does not contain hydrogen peroxide.

18. A method of preparing a food containing raw fry which comprises treating the raw fry with an aqueous alkali solution of a compound selected from the group consisting of sodium hydroxide, potassium hydroxide, calcium hydroxide, calcium oxide, magnesium carbonate. ammonium carbonate. sodium carbonate, sodium hydrogen carbonate, potassium hydrogen carbonate, and combinations thereof, then washing off or neutralizing the aqueous alkali solution attached to the treated fry, and treating the fry with a seasoning, wherein the treating is performed at a temperature of from 0 to 10° C. in the absence of peroxide or chlorine.

19. The method according to claim 18, wherein the aqueous alkali solution does not contain hydrogen peroxide.

20. A food containing raw fry which is prepared by treating the raw fry with an aqueous alkali solution of a compound selected from the group consisting of sodium hydroxide, potassium hydroxide, calcium hydroxide, calcium oxide, magnesium carbonate, ammonium carbonate, sodium carbonate, sodium hydrogen carbonate, potassium hydrogen carbonate, and combinations thereof to prevent darkening or browning of the raw fry, then washing off or neutralizing the aqueous alkali solution attached to the treated raw fry and treating the fry with a seasoning, wherein the treating is performed at a temperature of from 0 to 10° C. in the absence of peroxide or chlorine.

21. The method according to claim 20, wherein the aqueous alkali solution does not contain hydrogen peroxide.

22. A method of preparing fry free from browning or darkening from browned or darkened raw fry, which comprises treating the browned or darkened fry with an aqueous alkali solution of a compound selected from the group consisting of sodium hydroxide, potassium hydroxide, calcium hydroxide, calcium oxide, magnesium carbonate, ammonium carbonate, sodium carbonate, sodium hydrogen carbonate, potassium hydrogen carbonate, and combinations thereof and then washing off or neutralizing the aqueous alkali-solution attached to the fry, wherein the treating is performed at a temperature of from 0 to 10° C. in the absence of peroxide or chlorine.

23. The method according to claim 22, wherein the aqueous alkali solution does not contain hydrogen peroxide.

24. Fry free from browning or darkening, which are obtained by treating browned or darkened raw fry with an aqueous alkali solution of a compound selected from the group consisting of sodium hydroxide, potassium hydroxide, calcium hydroxide, calcium oxide, magnesium carbonate, ammonium carbonate, sodium carbonate, sodium hydrogen carbonate, potassium hydrogen carbonate, and combinations thereof and then washing off or neutralizing the aqueous alkali solution attached to the treated raw fry, wherein the treating is performed at a temperature of from 0 to 10° C. in the absence of peroxide or chlorine.

25. The method according to claim 24, wherein the aqueous alkali solution does not contain hydrogen peroxide.

26. The fry according to claim 24, comprising a reduced loss of shape or body dripping during storage of the fry.

27. A method of preventing whole fish from browning or darkening, which comprises treating the whole fish with an aqueous alkali solution of a compound selected from the group consisting of sodium hydroxide, potassium hydroxide, calcium hydroxide, calcium oxide, magnesium carbonate, ammonium carbonate, sodium carbonate, sodium hydrogen carbonate, potassium hydrogen carbonate, and combinations thereof and then washing off or neutralizing the aqueous alkali solution attached to the treated whole fish, wherein the whole fish originally has a white skin, wherein the treating is performed at a temperature of from 0 to 10° C. in the absence of peroxide or chlorine.

28. A method of preventing whole fish from browning or darkening, which comprises treating the whole fish with an aqueous alkali solution of a compound selected from the group consisting of sodium hydroxide, potassium hydroxide, calcium hydroxide, calcium oxide, magnesium carbonate, ammonium carbonate, sodium carbonate, sodium hydrogen carbonate, potassium hydrogen carbonate, and combinations thereof and then washing off or neutralizing the aqueous alkali solution attached to the treated whole fish, wherein the neutralizing of the aqueous alkali solution attached to the treated whole fish is performed during the course of boiling the whole fish in a solution of from 1 to 10% salt water by mass.

* * * * *